United States Patent
Jaloma et al.

(10) Patent No.: US 10,620,983 B2
(45) Date of Patent: Apr. 14, 2020

(54) MEMORY STRIPE WITH SELECTABLE SIZE

(71) Applicant: International Business Machines Corporation, Armonk, NY (US)

(72) Inventors: Jaime A. Jaloma, Austin, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 15/346,178

(22) Filed: Nov. 8, 2016

(65) Prior Publication Data
US 2018/0129422 A1    May 10, 2018

(51) Int. Cl.
  *G06F 9/00*     (2006.01)
  *G06F 12/00*    (2006.01)
  *G06F 9/455*    (2018.01)
  *G06F 9/4401*   (2018.01)
  *G06F 12/02*    (2006.01)

(52) U.S. Cl.
  CPC ........ *G06F 9/45558* (2013.01); *G06F 9/4403* (2013.01); *G06F 12/023* (2013.01); *G06F 2009/45583* (2013.01)

(58) Field of Classification Search
  None
  See application file for complete search history.

(56) References Cited

U.S. PATENT DOCUMENTS

| | | |
|---|---|---|
| 5,591,339 A | 1/1997 | Robinson |
| 5,728,792 A | 3/1998 | Tanaka et al. |
| 5,732,138 A | 3/1998 | Noll et al. |
| 5,938,123 A | 8/1999 | Heitzman |
| 6,063,044 A * | 5/2000 | Leonard ............... A61B 5/0053 600/587 |
| 6,591,339 B1 | 7/2003 | Horts et al. |
| 6,938,123 B2 | 8/2005 | Willis et al. |
| 7,373,438 B1 | 5/2008 | Debergalis et al. |
| 7,493,436 B2 | 2/2009 | Blackmore et al. |
| 7,783,787 B1 | 8/2010 | Debergalis et al. |
| 8,065,482 B2 | 11/2011 | Sato et al. |

(Continued)

OTHER PUBLICATIONS

Anselmi et al., IBM Power 550 Technical Overview, May 2009, International Technical Support Organization, REDP-4404-00, pp. 145-146 (Year: 2009).*

(Continued)

*Primary Examiner* — Reginald G Bragdon
*Assistant Examiner* — Michael L Westbrook
(74) *Attorney, Agent, or Firm* — Cantor Colburn LLP; David Quinn (57) ABSTRACT

A method of operating a virtual memory manager (VMM) in a computing system is provided. The method includes receiving a boot-up instruction, determining an amount of available configurable memory, determining a system logical memory block (LMB) size and selecting a memory stripe size for memory stripes respectively associated with LMBs provided within the available configurable memory. The selecting of the memory stripe size for the memory stripes is based in part on the determined amounts of the available configurable memory and the system LMB size.

10 Claims, 6 Drawing Sheets

(56) References Cited

U.S. PATENT DOCUMENTS

| | | |
|---|---|---|
| 8,347,296 B2 | 1/2013 | Yasutake |
| 8,560,750 B2 | 10/2013 | Sarkar |
| 9,032,127 B2 | 5/2015 | Fischer et al. |
| 9,141,573 B2 | 9/2015 | Saripalli |
| 9,158,575 B2 | 10/2015 | Smith |
| 9,652,405 B1 * | 5/2017 | Shain ............... G06F 12/122 |
| 2006/0200697 A1 | 9/2006 | Ito |
| 2006/0236059 A1 * | 10/2006 | Fleming ......... G06F 12/0223 |
| | | 711/170 |
| 2007/0157015 A1 * | 7/2007 | Swanson ............ G06F 9/4401 |
| | | 713/2 |
| 2007/0180214 A1 | 8/2007 | Radhakrishnan et al. |
| 2008/0307014 A1 * | 12/2008 | Patil .................... H03M 7/30 |
| 2009/0300091 A1 * | 12/2009 | Brokenshire ......... G06F 17/16 |
| | | 708/607 |
| 2012/0290788 A1 | 11/2012 | Klemm et al. |
| 2013/0262920 A1 | 10/2013 | Jung et al. |
| 2014/0208331 A1 | 7/2014 | Li et al. |
| 2015/0370716 A1 | 12/2015 | Patel et al. |

OTHER PUBLICATIONS

Jaime A. Jaloma et al.; "Thread Interrupt Offload Re-Prioritization", U.S. Appl. No. 15/346,139, filed Nov. 8, 2016.

List of IBM Patents or Patent Applicaqtions Treated as Related; (Appendix P), filed Nov. 8, 2016; 2 pages.

List of IBM Patents or Patent Applications Treated as Related; (Appendix P), filed Feb. 12, 2019; 2 pages.

Jaime A. Jaloma et al.; "Thread Interrupt Offload Re-Prioritization", U.S. Appl. No. 16/273,274, filed Feb. 12, 2019.

Anjum et al., "Bulk Scheduling With the Diana Schedule", IEEE, 2006, vol. 53, pp. 3818-3829.

* cited by examiner

MEMORY STRIPE WITH SELECTABLE SIZE

BACKGROUND

The present invention relates to virtual memory management (VMM) and, more specifically, to VMM operations in which an amount of available memory and a system logical memory block (LMB) size are considered in selecting and adjusting a memory stripe size.

System virtualization is a technology which can divide a single host (e.g., computer, server, etc.), into multiple parts or partitions with each running a separate instance or image of an operating system. The instances of the operating systems or partitions are separate or isolated from each other in some ways. For example, the partitions have separate file systems, separate users, separate applications and separate processes but may share some resources of the host (e.g., the memory, the kernel, the processors, the hard drives and/or other software, firmware and/or hardware of the host). Thus, each partition or instance of the operating system can look and feel like a separate server or machine from the perspective of its users. These instances are commonly referred to as "virtual" or "virtualized" machines and each partition may be referred to as a logical partition (LPAR).

One server or data processing system can generally host a number of LPARs. These LPARs have virtual resources assigned to them (e.g., virtual processors) which provide an abstraction of the physical resource from which it is based (e.g., the physical processor). For example, a virtual resource may be considered a logical entity that is backed up by the physical entity. In a dedicated mode of LPAR operation, physical resources are assigned as a whole to an LPAR such that the assigned physical resources are not shared by other LPARs. In a shared mode of LPAR operation, the physical resources are part of a pool of resources which are shared among the LPARs. Additionally, LPARs can be configured to have a certain entitlement capacity representing a guaranteed physical resource capacity for the LPAR. LPARs may also be configured as capped or uncapped. In a capped mode, the resource capacity for the LPAR is capped at some value (e.g., its entitlement capacity). In an uncapped mode, the LPAR can exceed its entitlement capacity when other shared resources are available.

SUMMARY

According to an embodiment of the present invention, a method of operating a virtual memory manager (VMM) in a computing system is provided. The method includes receiving a boot-up instruction, determining an amount of available configurable memory, determining a system logical memory block (LMB) size and selecting a memory stripe size for memory stripes respectively associated with LMBs provided within the available configurable memory. The selecting of the memory stripe size for the memory stripes is based in part on the determined amounts of the available configurable memory and the system LMB size.

According to another embodiment of the present invention, a computer program product is provided for deployment in a computing system. The computer program product includes available configurable memory and a virtual memory manager (VMM). The VMM is operably coupled to the available configurable memory and has executable instructions stored thereon, which, when executed, cause the VMM to manage a configuration of the available configurable memory during boot-up processes. The managing includes determining an amount of available configurable memory, determining a system logical memory block (LMB) size and selecting a memory stripe size for memory stripes respectively associated with LMBs provided within the available configurable memory. The selecting is based in part on the determined amounts of the available configurable memory and the system LMB size.

According to yet another embodiment of the present invention, a computing system is provided and includes available configurable memory and a virtual memory manager (VMM). The VMM is operably coupled to the available configurable memory and configured to manage a configuration of the available configurable memory during boot-up processes. The managing includes determining an amount of available configurable memory, determining a system logical memory block (LMB) size and selecting a memory stripe size for memory stripes respectively associated with LMBs provided within the available configurable memory. The selecting is based in part on the determined amounts of the available configurable memory and the system LMB size.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a virtual memory manager (VMM) is provided for operation in a computing system and operates by receiving a boot-up instruction, determining an amount of available configurable memory, determining a system logical memory block (LMB) size and selecting a memory stripe size for memory stripes respectively associated with LMBs provided within the available configurable memory. The selecting is based in part on the determined amounts of the available configurable memory and the system LMB size. The invention also provides a mechanism for the user of the system to set a stripe size to be used by the system and override the default stripe size.

An LMB is the smallest chunk of memory available for distribution to an LPAR, it is contained within one affinity domain. An LMB is sub-divided into memory stripes, which are smaller blocks of contiguous physical memory used by the VMM. The data structures used by the VMM to track and operate on physical memory are built using stripes, a larger memory stripe size allows the VMM data structures to scale up the amount of memory available to the system while still maintaining the amount of stripes that must be searched by the VMM. A bigger stripe size means less processing that has to be done by the VMM, even with a larger amount of memory available on the system.

Figure 1:
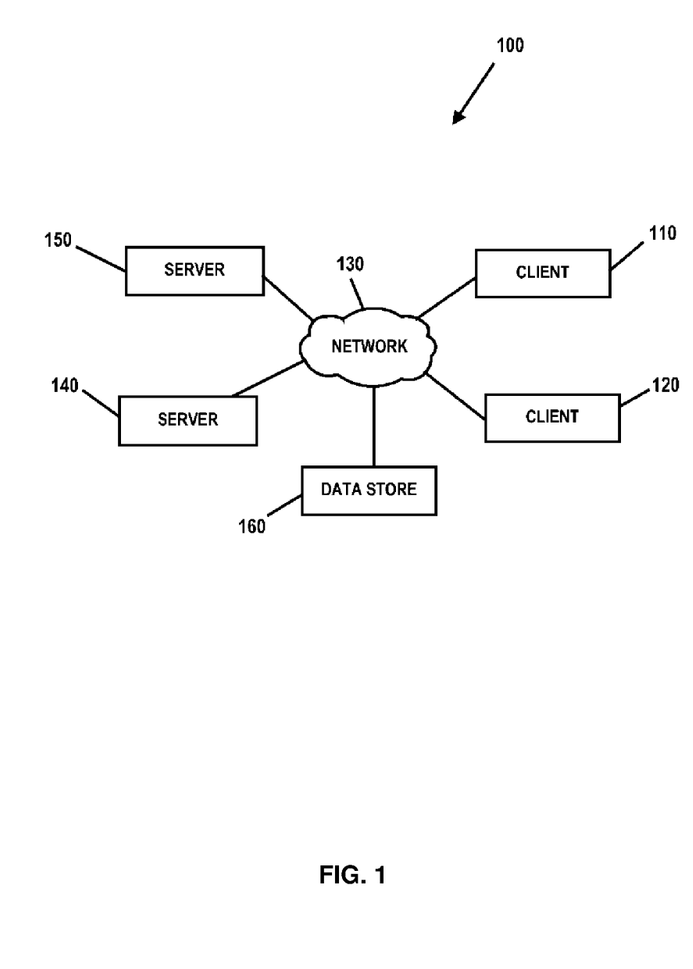
FIG. 1 is a diagram of a network of data processing systems in accordance with embodiments.
Figure 2:
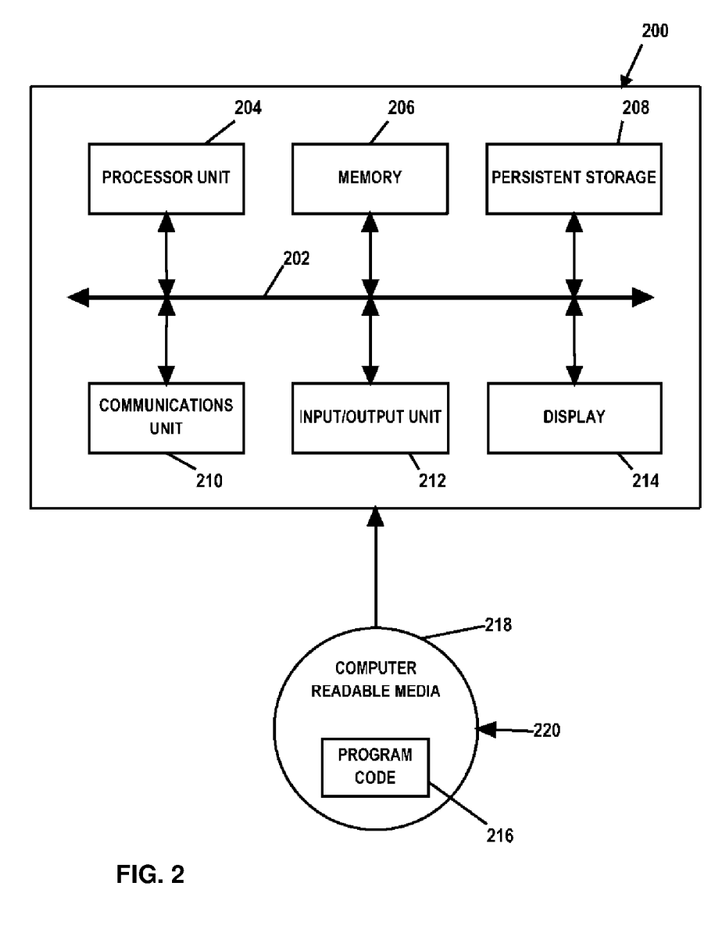
FIG. 2 is a diagram of a data processing system in accordance with embodiments.

With reference to FIGS. 1 and 2, diagrams of data processing environments are provided in which illustrative embodiments of the present disclosure may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 represents a network of data processing systems in which illustrative embodiments of the present disclosure may be implemented. Network data processing system 100 is a network of computers and includes network 130, which is the medium used to provide communications links between various devices and computers connected together within network data processing system 100, server 140 and server 150 that connect to network 130 along with data store 160 and clients 110 and 120. Server 140 and server 150 may be, for example, IBM® Power Systems™ servers. Clients 110 and 120 may be, for example, personal computers or network computers. In the depicted example, server 140 provides data and/or services such as, but not limited to, data files, operating system images and applications to clients 110 and 120. Network data processing system 100 may include additional servers, clients, and other devices.

With reference to FIG. 2, a data processing system 200 is provided whereby virtual machine operating systems are operable on server 140, server 150, client 110 or client 120. The data processing system 200 includes a bus or communications fabric 202, which provides communications between processor unit 204, memory 206, persistent storage 208, communications unit 210, input/output (I/O) unit 212 and display 214.

Processor unit 204 executes instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

I/O unit 212 enables input and output of data with other devices that may be connected to data processing system 200. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code or computer readable program code that may be read and executed by a processor in processor unit 204. The program code in the different embodiments may be embodied on different physical or tangible computer readable media such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive or a flash memory that is connected to data processing system 200. The tangible form of computer readable media 218 is also referred to as computer recordable storage media. In some instances, computer readable media 218 may not be removable. Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
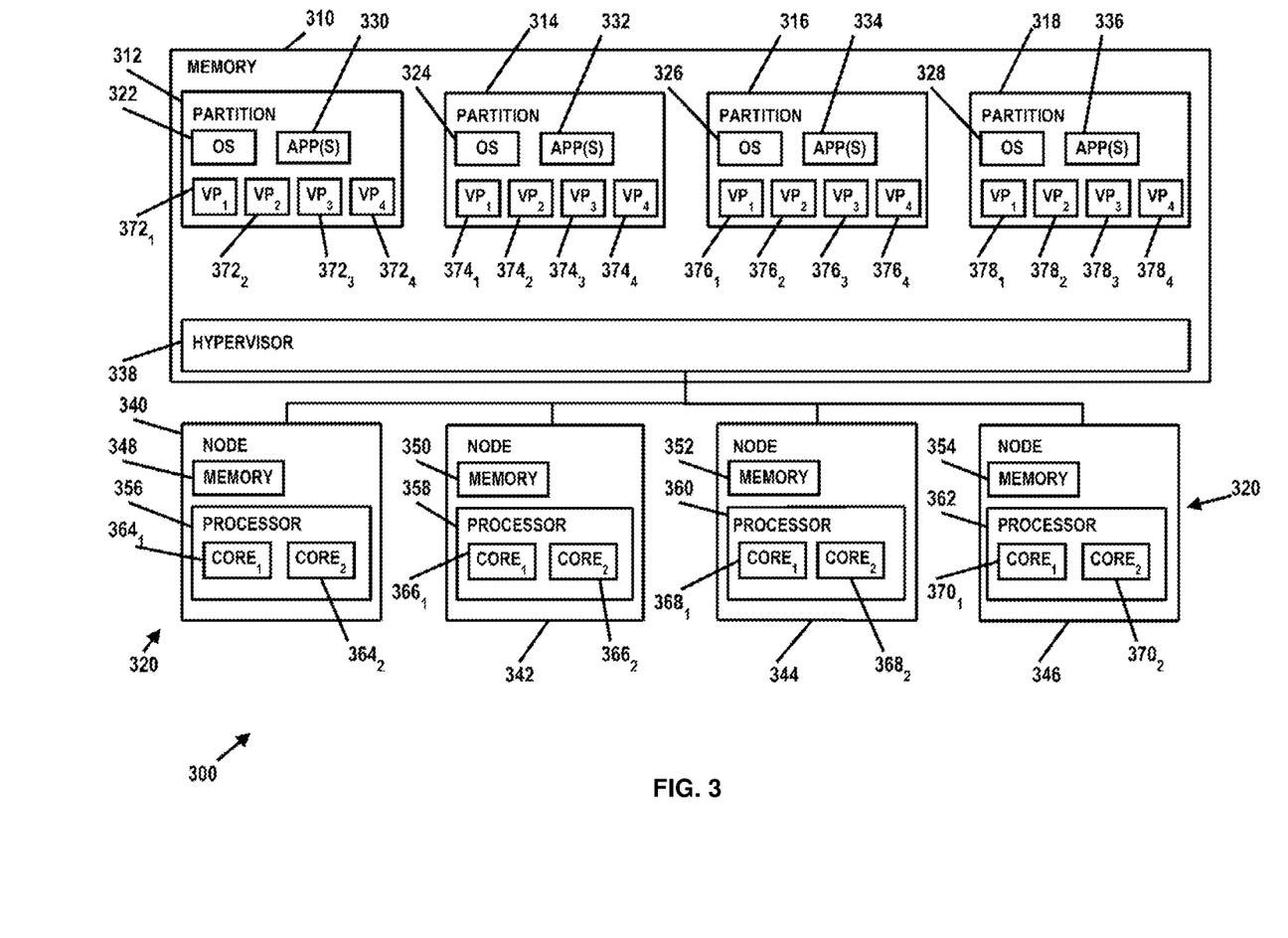
FIG. 3 is a diagram of a data processing system for operation of a virtual machine in accordance with embodiments.

FIG. 3 is an illustrative embodiment of a system 300 for supporting operations of virtual machine operating systems. System 300 may be implemented on data processing systems or platforms such as, but not limited to, servers 140 and/or 150, clients 110 and/or 120 or at other data processing system locations. In the embodiment illustrated in FIG. 3, system 300 is apportioned into logical partitions (LPARs) or virtual machines that may operate independently, each LPAR running its own operating system and applications. In the illustrated embodiment, system 300 includes a memory 310 having LPARs 312, 314, 316 and 318, however, it should be understood that a greater or fewer quantity of LPARs may be provisioned. LPARs are assigned a subset of a computer's physical hardware resources 320 (i.e., a subset of the hardware underlying the computer/server environment) and are virtualized within the computer/server environment as a separate computer/virtual machine. Resources such as processor capacity, memory, or any other type of resource may be assigned to a particular LPAR. Each LPAR has its own virtual operating system (OS) instance (e.g., operating systems 322, 324, 326 and 328 in respective LPARs 312, 314, 316 and 318), application programs (e.g., application(s) 330, 332, 334 and 336 in respective LPARs 312, 314, 316 and 318) and/or associated files, allowing for multiple operating systems to be simultaneously executing within the server computer/environment.

Logical partitioning is facilitated by logic or software 338 (a "hypervisor") that controls the computer system's hardware and monitors the operating systems of the LPARs. For example, hypervisor 338 may comprise software, logic and/or executable code for performing various functions as described herein (e.g., residing as software and/or an algorithm running on a processor unit). Hypervisor 338 operates at a level between the logical partition operating systems level and computer/server system physical hardware resources 320. Hypervisor 338 may run directly on the computer system's hardware or within a conventional operating system environment, depending upon the implementation.

In the illustrated embodiment, physical resources 320 include a number of integrated circuits (ICs), chips or processing nodes 340, 342, 344 and 346. The quantity and/or types of physical resources may vary. In the illustrated embodiment, each respective node 340, 342, 344 and 346 includes a memory 348, 350, 352 and 354 and a processor 356, 358, 360 and 362. Each processor 356, 358, 360 and 362 may include one or more processor cores. For example, processor 356 includes cores $364_1$-$364_2$, processor 358 includes cores $366_1$ and $366_2$, processor 360 includes cores $368_1$ and $368_2$, and processor 362 includes cores $370_1$ and $370_2$. It should be understood that the quantity of cores for any particular node may vary. Nodes 340, 342, 344 and 346 (or components thereof) may comprise a shared physical resource pool (e.g., as to processors 356, 358, 360 and 362, a shared processor pool). The shared pool of physical resources enables a system or apparatus to assign whole and/or partial resources to a logical partition. For example, physical processors 356, 358, 360 and 362 may be configured as a processing pool such that processors 356, 358, 360 and 362 (as well as their respective cores) are shared among numerous logical partitions (e.g., LPARs 312, 314, 316 and 318).

Logical partitions may be assigned virtual resources which may include logical entities backed up by corresponding physical entities. For example, logical partitions may be assigned virtual processors which are depictions of physical processors (e.g., processors 356, 358, 360 and 362) that are presented to the operating system of the respective partition. The types of physical resources that may be virtualized may vary. With respect to virtual processors, each virtual processor may represent a processing capacity (e.g., a processing unit) of a physical processor. The processing capacity represented by a virtual processor may be the entire processing capacity of a physical processor or a portion thereof. In the illustrated embodiment, each LPAR 312, 314, 316 and 318 has assigned thereto a number of virtual processors. For example, LPAR 312 includes virtual processors ($VP_1$-$VP_4$) $372_1$-$372_4$. Similarly, LPAR 314 includes virtual processors ($VP_1$-$VP_4$) $374_1$-$374_4$, LPAR 316 includes virtual processors ($VP_1$-$VP_4$) $376_1$-$376_4$, and LPAR 318 includes virtual processors ($VP_1$-$VP_4$) $378_1$-$378_4$. The number of virtual processors assigned to a particular partition and/or an overall computing platform may vary.

In some embodiments, LPARs can be configured to have a certain entitlement capacity or entitled resources representing a guaranteed physical resource capacity for the LPAR. For example, LPAR 312 includes four virtual processors and may have a core entitlement of two such that a two-core processing capacity is guaranteed for LPAR 312. Because the cores may be allocated from a shared processor pool, hypervisor 338 allocates core processing capacity from the shared processor pool as needed, which means the cores provided to LPAR 312 to meet its entitlement may also be used by other LPARs. In an uncapped mode of operation, if LPAR 312 requires additional processing capacity beyond its entitlement, hypervisor 338 may allocate additional cores from the shared processor pool (if available).

Generally, there are multiple storage levels a core may access. These include, but are not limited to, processor caches (L1, L2, L3, etc.), memory (RAM), and disk storage. Further, within each storage level there may be multiple levels of affinity (e.g., determined by the distance between a core and the memory it accesses). The first level of affinity may include a memory located on the same chip as the core, a next level of affinity may refer to memory located on a neighbor chip, etc.

Figure 4:
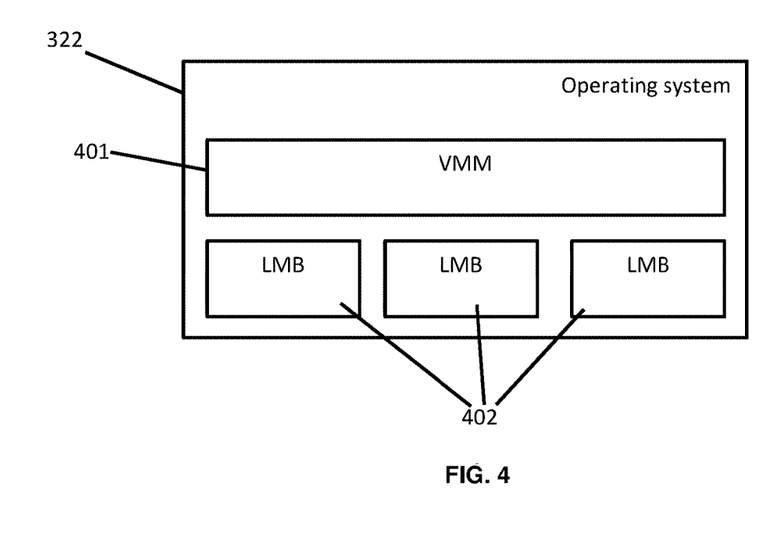
FIG. 4 is a diagram illustrating a data processing system for operation of a virtual machine in accordance with embodiments.

FIG. 4 is a diagram illustrating an embodiment of operating system and hypervisor interaction. In the embodiment illustrated in FIG. 4, a single operating system instance is shown (e.g., OS 322), however, it should be understood that other operating systems of system 300 may be similarly configured. In operation, operating system 322 uses data structures called memory pools to manage the free memory in each memory resource and includes a virtual memory manager (VMM) 401. The VMM 401 may include software, logic and/or executable code for performing various functions as described herein (e.g., residing as software and/or an algorithm running on a processor unit) and serves in part to maintains memory topology information in various domains. Of those domains, one type may include a collection of logical memory blocks (LMBs) 402.

The LMB size in a given computing system (e.g., AIX®) is calculated using the following guidelines:

| Amount of configurable memory | Default memory block size |
|---|---|
| Up to 4 GB | 16 MB |
| Greater than 4 GB and up to 8 GB | 32 MB |
| Greater than 8 GB and up to 16 GB | 64 MB |
| Greater than 16 GB and up to 32 GB | 128 MB |
| Greater than 32 GB | 256 MB |

For the purposes of the present disclosure, it is to be understood that LMB sizes are maintained until a next system reboot. For example, the AIX® system uses a 16 MB memory stripe size to ensure that adding and removing an LMB would hit multiple memory pools (mempool) and still maintain a relatively balanced virtual memory pool (VMpool). A mempool is a compartmentalization of memory into a related unit. Each mempool has its own infrastructure that allows the VMM to perform memory operations and each one has its own page stealing and replacement process and maintains its own free lists. A VMpool defines all of the memory for a given affinity domain. With 16 TB of real memory in a given computing system, a 16 MB memory stripe size leads to $2^{20}$ (1,048,576) memory stripes (i.e., [16 TB×1024 GB/1 TB×1024 MB/1 GB]/16 MB=$2^{20}$ (1,048, 576). An increase to 32 TB would double this result to $2^{21}$ (2,097,152) memory stripes and lead to a corresponding increase in the size of the VMM data structures and the amount of processing that must be done by the VMM.

Embodiments discussed herein relate to a selectable memory stripe size whereby the performance of various search operations can be improved while the memory footprint of the VMM data structures can be decreased. That is, a selectable memory stripe size based on system LMB size and LPAR available memory would decrease the amount of stripes that need to be configured by the VMM or the system as a whole.

In accordance with embodiments, the following guidelines may be used to set the memory stripe size:

| Amount of configurable memory | Memory block size | Stripe size |
|---|---|---|
| Up to 8 TB | 16 MB, 32 MB, 64 MB, 128 MB or 256 MB | 16 MB |
| Greater than 8 TB and up to 16 TB | 256 MB | 32 MB |
| Greater than 16 TB | 256 MB | 64 MB |

As shown above, 8 TB is effectively set as the dividing boundary between the use of the legacy 16 MB memory stripe size and the new larger memory stripe sizes. This is done as an example. With a 16 MB memory stripe size, $2^{19}$ (524,288) memory stripes will be configured for 8 TB. A 32 MB memory stripe size leads to $2^{19}$ memory stripes configured for 16 TB and a 64 MB memory stripe size leads to $2^{19}$ stripes for 32 TB. Thus, it is seen that an increase in memory which is coupled with an increase in memory stripe size gives the same amount of stripes that need to be configured and, by extension, the amount of intervals that must be searched by the VMM remain the same while the amount of memory that is actually searched has increased.

The present description does not increase the frequency of the memory pool rebalancing code running in the VMM. Memory pool rebalancing relates to scaling improvements done to ensure that processing done by the VMM on each individual memory pool remains relatively uniform. As memory is added and removed from the system, it is possible for the memory pools to become unbalanced to the point where one memory pool has to process more memory than the others. Memory pool rebalancing allows the VMM to move memory between mempools and to distribute the processing load to multiple processes. The rebalancing algorithm takes the average size of all the memory pools and compares it to the largest and the smallest mempool. If they are within 10 percent of the average, the memory pools are balanced and no rebalancing is needed.

With this in mind, larger memory stripe sizes coupled with larger memory size are not large enough to affect the rebalancing code. Thus, a sample LPAR with 8.00 . . . 001 TB memory size, 32 MB memory stripe size, and 128 configured memory pools will have an average of 64 GB per mempool. In order to trigger the rebalancing code, a mempool would need to be +/± 6.4 GB from the average mempool size. A single 32 MB memory stripe only accounts for roughly 0.49% of the total. Another sample LPAR with 16.00 . . . 001 TB of memory, 64 MB memory stripe size, and 128 configured mempools would have an average of 128 GB per mempool. In this case, triggering the rebalancing code would require a difference of +/± 12.8 GB from the average. A single 64 MB memory stripe would once again only account for 0.49% of the total needed to trigger mempool rebalancing. Both of these examples only take into account the absolute minimum memory needed to trigger the larger memory stripe size. A larger pool of available memory would increase the average mempool size and further decrease the influence of an individual memory stripe on the rebalancing code.

A selectable stripe size allows the performance of memory operations such as memory add and remove to scale up with the available memory. The add and remove memory operations are processed by stripe size. Using the examples above, with an LMB of 256 MB, 16 stripes must be processed for the 16 MB stripe size, 8 for the 32 MB stripe, and 4 for the 64 MB stripe. As described in the previous paragraph, the influence of an individual stripe on the system has an inverse relationship with the amount of memory available. As the amount of memory increases, the influence of the individual stripe decreases. A larger memory stripe means that the VMM has to spend less time processing each individual LMB which leads to a performance improvement. The VMM processing 16 memory stripes means that with a stripe size of 16 MB, only one LMB would be added to the system, while a stripe size of 64 MB means that 4 LMBs would be added to the system even though the amount of stripes processed is the same in both cases.

In accordance with embodiments, VMM system initialization code dictates that an amount of memory available and a system LMB size are determined and that the memory stripe size will be adjusted accordingly based on those two variables. Such code may be written as follows:

Selectable Stripe Size:

```
Select_stripe_size ( )
{
    if ((RAM_Size > 16TB) && (LMB_size == 256MB))
    {
        stripe = 64MB
    }
    else if ((RAM_Size > 8TB) && (LMB_size == 256MB))
    {
        stripe = 32 MB
    }
    else
    {
        stripe = 16 MB
    }
}
```

Figure 5:
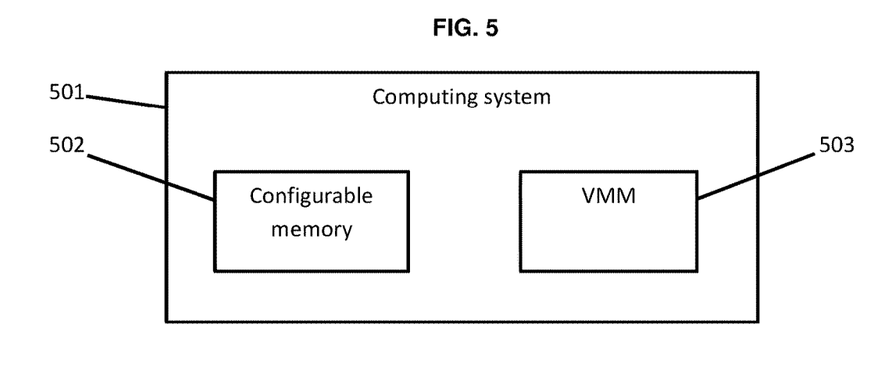
FIG. 5 is a computing system for supporting selection and adjustment of a memory stripe size.

With the above in mind and, with reference to FIG. 5, a computer program product is provided for deployment in a computing system 501. The computing system 501 is similar to the systems described above and includes available configurable memory 502 and a virtual memory manager (VMM) 503. The VMM 503 is operably coupled to the available configurable memory and has executable instructions stored thereon. When executed, the executable instructions cause the VMM 503 to initially receive a boot-up or system initialization command and to subsequently manage a configuration of the available configurable memory during boot-up processes.

Figure 6:
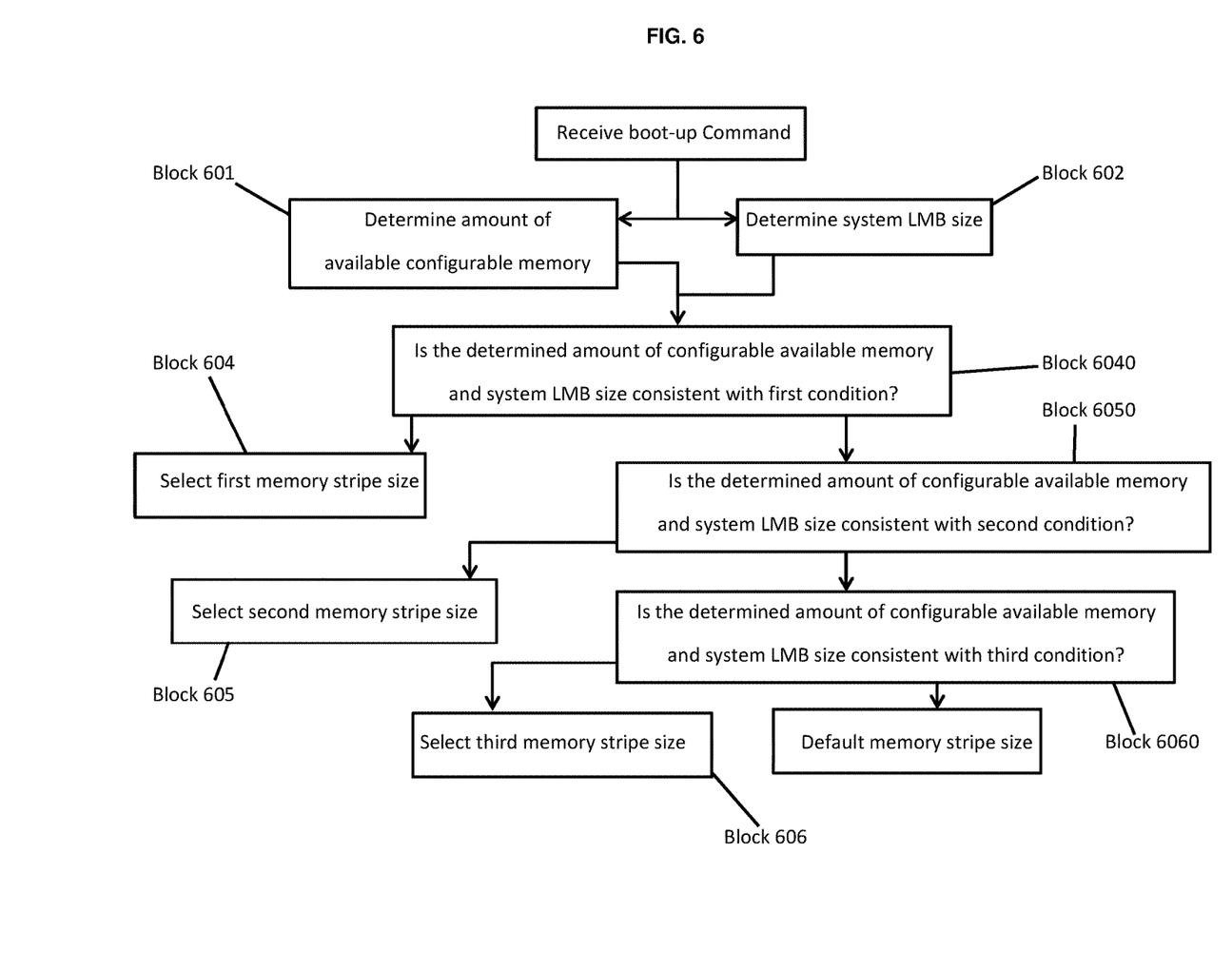
FIG. 6 is a flow diagram illustrating the selecting and adjusting of a memory stripe size in accordance with embodiments.

With reference to FIG. 6, the management of the available configurable memory by the VMM 503 (see FIG. 5) is conducted following reception of a boot-up or system initialization command by determining an amount of available configurable memory (block 601), determining a system logical memory block (LMB) size (block 602) and selecting one of first, second or third memory stripe sizes for memory stripes respectively associated with LMBs provided within the available configurable memory in an event the determined amounts of the available memory and the system LMB size are consistent with first, second or third conditions, respectively (blocks 604, 605 and 606).

That is, the selecting may be based on the determined amounts of the available configurable memory and the system LMB size. In accordance with embodiments, the selecting may include selecting the first memory stripe size (block 604) in an event the determined amount of the available configurable memory (CM) is up to a first CM size (e.g., 8 TB) and the system LMB size is a predefined LMB size (e.g., 256 MB). Alternatively, the selecting may include selecting the second memory stripe size (block 605), which is larger than the first memory stripe size, in an event the determined amount of the available configurable memory is greater than the first CM size (e.g., 8 TB) and up to a second CM size (e.g., 16 TB) and the system LMB size is the predefined LMB size (block 6050). As yet another alternative, the selecting may include selecting the third memory stripe size (block 606), which is larger than the second memory stripe size, in an event the determined amount of the available configurable memory is greater than the second CM size (e.g., 16 TB) and the system LMB size is the predefined LMB size (block 6060).

In accordance with further embodiments, the first memory stripe size is a legacy memory stripe size. More particularly, the first memory stripe size may be 16 MB, the second memory stripe size may be 32 MB and the third memory stripe size may be 64 MB.

Figure 7:
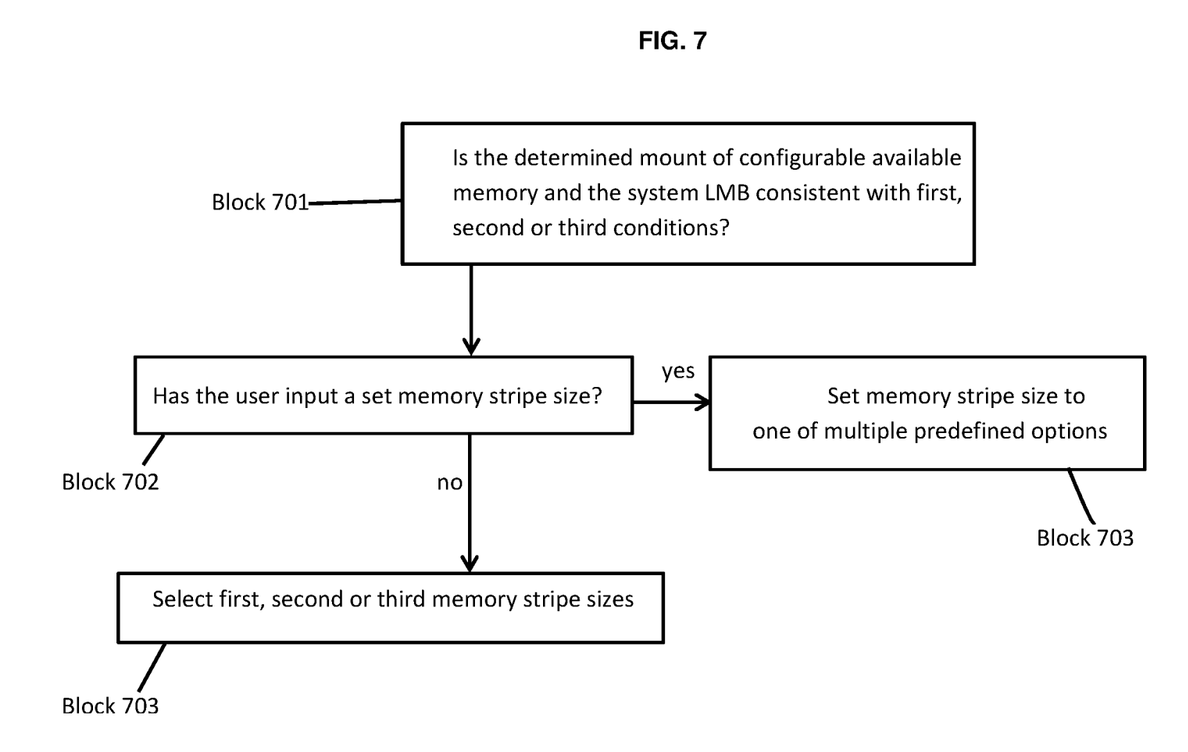
FIG. 7 is a flow diagram illustrating a further or alternative method of selecting an adjusting the memory stripe size in accordance with embodiments.

In accordance with further or alternative embodiments and, with reference to FIG. 7, a method of operating a VMM in a computing system is provided. The method includes receiving a boot-up instruction and selecting a memory stripe size for memory stripes as described in general above (block 701). Here, though, the selecting of the memory stripe size for the memory stripes can be further based on a variable or a set of variables set by the user and read during system initialization. That is, the method can allow for the establishment and definition of a tunable that allows a user to set a stripe size to one of multiple predefined options and, in doing so, to bypass selection criteria. Thus, the method includes a determination of whether the user has inputted a set memory stripe size (block 702). If not, the memory stripe size is set to the first, second or third memory stripe sizes as noted above (block 703). On the other hand, if the user has made such input, the memory stripe size is set to one of multiple predefined options that the user can select or which can be selected automatically (block 704).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating a virtual memory manager (VMM) in a computing system, the method comprising:
   receiving a boot-up instruction;
   determining an amount of available configurable memory (CM);
   determining a system logical memory block (LMB) size; and
   selecting a memory stripe size for memory stripes respectively associated with LMBs provided within the available CM based in part on the determined amounts of the available CM and the system LMB size,
   wherein the selecting comprises selecting one of:
   a first memory stripe size in an event the determined amount of the available CM is up to a first number of terabits (TBs) and the system LMB size is a $1^{st}$-$5^{th}$ multiple of a predefined LMB size;
   a second memory stripe size, which is larger than the first memory stripe size, in an event the determined amount of the available configurable memory is greater than the first number of TBs and less than a second number of TBs and the system LMB size is the $5^{th}$ multiple of the predefined LMB size; or
   a third memory stripe size, which is larger than the second memory stripe size, in an event the determined amount of the available configurable memory is greater than the second number of TBs and the system LMB size is the $5^{th}$ multiple of the predefined LMB size.

2. The method according to claim 1, wherein the selecting is responsive to a user input.

3. The method according to claim 1, wherein the first memory stripe size is 16 MB, the second memory stripe size is 32 MB and the third memory stripe size is 64 MB.

4. A computer program product for deployment in a computing system comprising:
   available configurable memory (CM); and
   a virtual memory manager (VMM), which is operably coupled to the available CM and has executable instructions stored thereon, which, when executed, cause the VMM to manage a configuration of the available CM during boot-up processes by:
   determining an amount of available CM,
   determining a system logical memory block (LMB) size, and
   selecting a memory stripe size for memory stripes respectively associated with LMBs provided within the available CM based in part on the determined amounts of the available CM and the system LMB size,
   wherein the selecting comprises selecting one of:
   a first memory stripe size in an event the determined amount of the available CM is up to a first number of terabits (TBs) and the system LMB size is a $1^{st}$-$5^{th}$ multiple of a predefined LMB size;
   a second memory stripe size, which is larger than the first memory stripe size, in an event the determined amount of the available CM is greater than the first number of TBs and less than a second number of TBs and the system LMB size is the $5^{th}$ multiple of the predefined LMB size; or
   a third memory stripe size, which is larger than the second memory stripe size, in an event the determined amount of the available CM is greater than the second number of TBs and the system LMB size is the $5^{th}$ multiple of the predefined LMB size.

5. The computer program product according to claim 4, wherein the first memory stripe size is a legacy memory stripe size.

6. The computer program product according to claim 4, wherein the first memory stripe size is 16 MB, the second memory stripe size is 32 MB and the third memory stripe size is 64 MB.

7. A computing system, comprising:
   available configurable memory (CM); and
   a virtual memory manager (VMM), which is operably coupled to the available CM and configured to manage a configuration of the available CM during boot-up processes by:
   determining an amount of available CM,
   determining a system logical memory block (LMB) size, and
   selecting a memory stripe size for memory stripes respectively associated with LMBs provided within the available CM based in part on the determined amounts of the available CM and the system LMB size, wherein the VMM executes the selecting by selecting one of:

a first memory stripe size in an event the determined amount of the available CM is up to a first number of terabits (TBs) and the system LMB size is a $1^{st}$-$5^{th}$ multiple of a predefined LMB size;

a second memory stripe size, which is larger than the first memory stripe size, in an event the determined amount of the available configurable memory is greater than the first number of TBs and less than a second number of TBs and the system LMB size is the $5^{th}$ multiple of the predefined LMB size; or a third memory stripe size, which is larger than the second memory stripe size, in an event the determined amount of the available configurable memory is greater than the second number of TBs and the system LMB size is the $5^{th}$ multiple of the predefined LMB size.

8. The computing system according to claim 7, wherein:

instructions for executing the management of the configuration of the available configurable memory are stored in VMM system initialization code, and the amount of available configurable memory and the system LMB size are both constant.

9. The computing system according to claim 7, wherein the first memory stripe size is a legacy memory stripe size.

10. The computing system according to claim 7, wherein the first memory stripe size is 16 MB, the second memory stripe size is 32 MB and the third memory stripe size is 64 MB.

\* \* \* \* \*